US011774617B2

(12) United States Patent
Tong et al.

(10) Patent No.: US 11,774,617 B2
(45) Date of Patent: Oct. 3, 2023

(54) FIVE-COMPONENT MARINE NATURAL GAS HYDRATE INTELLIGENT SENSING NODE

(71) Applicant: Ocean University of China, Qingdao (CN)

(72) Inventors: Siyou Tong, Qingdao (CN); Kai Wang, Qingdao (CN); Xiugang Xu, Qingdao (CN); Zhangju Liu, Qingdao (CN); Dan Liang, Qingdao (CN)

(73) Assignee: OCEAN UNIVERSITY OF CHINA, Qingdao (CN)

( * ) Notice: Subject to any disclaimer, the term of this patent is extended or adjusted under 35 U.S.C. 154(b) by 498 days.

(21) Appl. No.: 17/144,271

(22) Filed: Jan. 8, 2021

(65) Prior Publication Data
US 2021/0208297 A1    Jul. 8, 2021

(30) Foreign Application Priority Data
Jan. 8, 2020   (CN) .......................... 202010018725.9

(51) Int. Cl.
*G01V 1/38*        (2006.01)
*G01V 1/20*        (2006.01)
(52) U.S. Cl.
CPC ............ *G01V 1/3808* (2013.01); *G01V 1/201* (2013.01)
(58) Field of Classification Search
CPC .............................. G01V 1/3808; G01V 1/201
See application file for complete search history.

(56) References Cited

U.S. PATENT DOCUMENTS

2010/0097886 A1*  4/2010  Day ....................... G01V 1/364
                                                                 367/24
2011/0292767 A1* 12/2011  Dai ..................... G01V 1/3808
                                                                 367/73
(Continued)

FOREIGN PATENT DOCUMENTS

WO    WO-2019165696 A1 *  9/2019  ............. B63B 17/00

OTHER PUBLICATIONS

Liu et al., "Monitoring and research on environmental impacts related to marine natural gas hydrates: Review and future perspective", Journal of Natural Gas Science and Engineering 65 May 2019, 82-107 (Year: 2019).*

*Primary Examiner* — Krystine E Breier
(74) *Attorney, Agent, or Firm* — McClure, Qualey & Rodack, LLP

(57) ABSTRACT

The present invention provides a five-component marine natural gas hydrate intelligent sensing node, comprising a titanium alloy compartment, an information acquisition unit, an integrated control chip, and a power module; the integrated control chip comprises an intelligent computing unit and a transmission unit; the intelligent computing unit is configured for acquiring quality monitoring indicators of marine natural gas hydrates by feature extraction and transmitting reduced represented features to a monitoring device on the sea surface via the transmission unit. The present invention has overcome problems of impossible timely quality monitoring due to blind acquisition process, promised a controllable undersea node working status, and acquired data are complete without any loss, which doesn't only facilitate nonconventional energy resources such as marine hydrates prospection, and is also of great application prospect and value in oil and gas resources exploration, geological hazards precautions and evaluation.

7 Claims, 1 Drawing Sheet

(56) References Cited

U.S. PATENT DOCUMENTS

2016/0349387 A1\* 12/2016 Rokkan ................ G01V 1/3808
2019/0233279 A1\* 8/2019 Yanagisawa ............ G01P 1/023

\* cited by examiner

FIVE-COMPONENT MARINE NATURAL GAS HYDRATE INTELLIGENT SENSING NODE

TECHNICAL FIELDS

The present invention relates to marine information prospection technical field, especially a five component marine natural gas hydrate intelligent sensing node.

BACKGROUND TECHNOLOGY

Marine seismic prospection is one of primary ways to explore and develop marine oil and gas resources. Marine seismic acquisition technology represented by air gun sources and marine streamers is widely used due to advantages such as, low cost, high efficiency, intense construction sites, and big operation range, and has played a significant role in marine resources exploration. However, there are some defects with marine streamer, such as narrow signal azimuth, limited frequency band, only longitudinal wave component information available and subject to multiple reflection interruption.

As a new underwater seismic acquisition instrument, ocean bottom nodes have been broadly recognized by main international oil companies due to acquisition performance and environmental adaption ability. Ocean bottom nodes usually work with four component detectors, which cannot only retrieve longitudinal wave pressure component, but also are able to collect data regarding velocity components in X, Y and Z directions.

In marine natural gas hydrate prospection, as a result of special existing conditions of hydrates (low temperature and high pressure), it is of great significance to acquire marine temperature information. At present, mature ocean bottom node equipment are designed for oil and gas resource exploration, aiming at acquiring seismic wave information, and when used in precise detection of hydrates, acquired parameters don't appear to be sufficient, as important information such as marine temperature which indicates existence of hydrates is absent. To collect this important information, it is necessary to deploy new navigation ships and use other equipment, which is time-consuming, brings huge cost, and is liable to information inconsistency as information is not collected in the same time.

Conventional ocean bottom nodes are working blindly, that is, acquisition parameters of the acquisition instruments have been set up in an exploration ship, and OBNs are put on the seabed with ready batteries, and a vibration source ship will act as vibration source initiator. When all vibration points have been initiated, retrieve the OBNs, download data in a ship, and process them. OBNs serve only to collect data. As data acquisition is done blindly, timely monitor and evaluation of the data is not possible and once the instruments are not working properly, data loss at concerned collection point will happen and an irremediable loss will occur.

SUMMARY OF THE INVENTION

Target of the present invention is to address defects of the prior arts, and provide a five-component marine natural gas hydrate intelligent sensing node, by which, it is possible to attain more parameters and realize accurate prospection of the natural gas hydrates.

A five-component marine natural gas hydrate intelligent sensing node, comprising a titanium alloy compartment, an information acquisition unit, an integrated control chip and a power module for the information acquisition unit and the integrated control chip in the titanium alloy compartment. Said information acquisition unit comprises a sensor unit including a three-axis geomagnetic sensor, an inclinometer, a temperature sensor, three-component broadband seismometers, and a hydrophone of high sensitivity.

Said integrated control chip comprises an intelligent computing unit and a transmission unit. Said intelligent computing unit extracts quality monitoring indicators of marine natural gas hydrates by feature extraction, and transfers the quality monitoring indicators with reduced represented features to a monitoring device in the sea surface by the transmission unit.

Said quality monitoring indicators comprise amplitude, frequency and energy value of three velocity components and a pressure component.

Further, the five-component marine natural gas hydrate intelligent sensing node, wherein, the three-component broadband seismometers and the high sensitivity hydrophone are respectively internally disposed on a bottom side and a top side of the sensor unit in the titanium alloy compartment Still further, the five-component marine natural gas hydrate intelligent sensing node, wherein, the temperature sensor is provided outside the titanium alloy compartment to measure seawater temperature data at where the temperature sensor is located.

Further still, the five-component marine natural gas hydrate intelligent sensing node, wherein, shackles are provided in outer sides of the titanium alloy compartment, to connect with plastic covered steel wire ropes.

Further, in the five-component marine natural gas hydrate intelligent sensing node, the titanium alloy compartment is made from high strength titanium alloy materials with maximum bearable pressure at 2000 m underwater.

Still further, the five-component marine natural gas hydrate intelligent sensing node, wherein, the three-component broadband seismometers comprises an acceleration detector, a piezoelectric detector and an MEMS detector.

Further still, the five-component marine natural gas hydrate intelligent sensing node, wherein, all intelligent sensing nodes are fixed on the plastic covered steel wire ropes in predetermined intervals, and the plastic covered steel wire ropes are connected with a center control end, to conduct an accurate marine natural gas hydrates prospection, and transfer acquired information to the center control end.

With the five-component marine natural gas hydrate intelligent sensing node provided by the present invention, it is possible to sense a variety of marine natural gas hydrate indicators. By intelligently sensing natural gas hydrates with multi-component information, and acknowledging status of all nodes by feature extraction, with extracted feature values such as amplitude, frequency and energy and by sending the same back to the ship for monitoring, the problem that timely quality control is not available in the current blind working modes is successfully solved, working status of undersea nodes become controllable, and acquired data are complete without any loss, as a result, unconventional energy such as marine natural gas hydrates prospection can be done excellently, and it is of significant application prospect and value in oil and gas reservoir exploration, geologic hazard precautions and evaluation.

Furthermore, by providing a temperature sensor in addition to the conventional four-component nodes, the five component marine natural gas hydrates intelligent sensing nodes provided by the present invention achieves a more accurate and reliable prospection result, and improves exploration accuracy, and is more suitable for natural gas hydrates prospection and will sense the same better.

1—Intelligent sensing node; 2—plastic covered steel wire rope; 11—titanium alloy compartment; 12—sensor unit; 13—integrated control chip; 14—power module; 15—data output port; 16—shackle; 121—temperature sensor.

Embodiments

To show purposes, technical plans and advantages of the present invention more clearly, a clear and complete description will be given to technical plans of the present invention, however, embodiments described here are merely some embodiments of the present invention rather than all. Based on the embodiments provided in the present invention, all other embodiments that those skilled in the art make without any creative effort fall within protection scope of the present invention.

Figure 1:
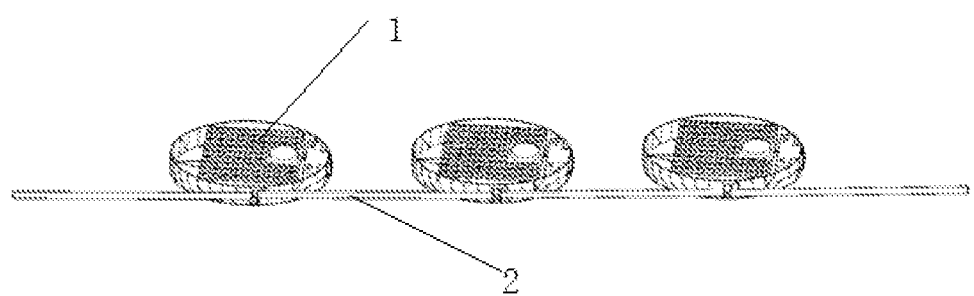
FIG. 1 is a schematic diagram showing concatenation of a plurality of intelligent sensing nodes deployed under the sea.

As is shown in FIG. 1, the five-component marine natural gas hydrate intelligent sensing node according to the present invention, comprises several intelligent sensing nodes 1 provided under the sea; all the intelligent sensing nodes 1 are fixed on plastic covered steel wire ropes 2 in predetermined intervals, the plastic covered steel wire ropes 2 are connected with a center control end to conduct accurate prospection of undersea hydrates, and communicate acquired information to said center control end by a magnetic coupling communication method.

Specifically, when detecting proper timing or receiving an order, the intelligent sensing node will extract amplitude, frequency and energy of three velocity components and a pressure component by feature extraction from quality monitoring indicators, transfer reduced represented features and communicate the same to a monitoring device by a magnetic coupling communication method.

Figure 2:
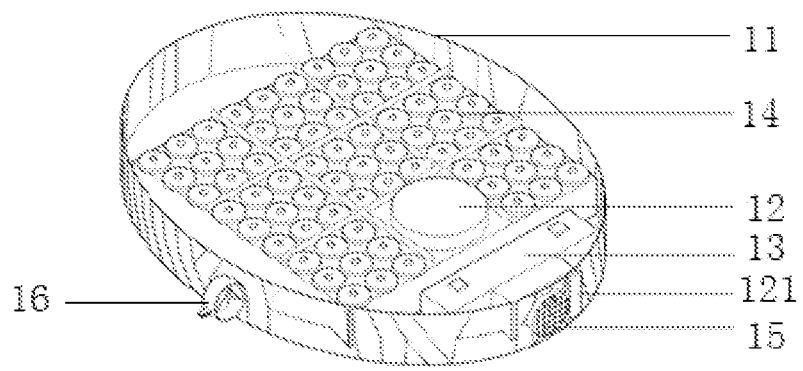
FIG. 2 is a schematic diagram showing constituent units of an intelligent sensing node.

As is shown in FIG. 2, the intelligent sensing node comprises a titanium alloy compartment 11, and an information acquisition unit, an integrated control chip 13, and a power module 14 for supplying the information acquisition unit and the integrated control chip 13 configured integrally in the titanium alloy compartment 11.

The information acquisition unit comprises a sensor unit 12 including a three-axis geomagnetic sensor, an inclinometer and a temperature sensor, three-component broadband seismometers, and a hydrophone of high sensitivity.

Said integrated control chip 13 comprises an intelligent computing unit and a transmission unit. Said intelligent computing unit extracts quality monitoring indicators of marine natural gas hydrates by feature extraction, and transfers the quality monitoring indicators with reduced represented features to a monitoring device in the sea surface by the transmission unit.

Said quality monitoring indicators comprise amplitude, frequency and energy value of three velocity components and a pressure component.

Specifically, the three-axis geomagnetic sensor detects directions by detecting geomagnetic field; the inclinometer measures an inclining angle against a horizontal plane, and in combination the above two instruments serve as an orientation measuring unit, for providing high precision vector field information for seismic acquisition, and making orientation correction for acquired seismic data. Said three-axis geomagnetic sensor and said inclinometer constitute an orientation measuring unit of low power consumption, to provide a high precision vector field for seismic acquisition. Said three-axis broadband sensor is installed in an orthogonal coordinate system, to realize a high precision seismic acquisition.

By communicating and quantified data indicator transmission by magnetic coupling, the intelligent sensing node provided by the present invention realizes quality monitoring orders reception and sensed feature information delivery.

Further, the three-component broadband seismometers and the high sensitivity hydrophone are respectively internally placed in a bottom side and a top side of the sensor unit 12 in the titanium alloy compartment.

Further still, the temperature sensor is provided outside the titanium alloy compartment, for measuring seawater temperature data at where the temperature sensor is located. And shackles 16, connected with the plastic covered steel wire ropes are provided to outer sides of the titanium alloy compartment 11.

Equipped with a titanium alloy casing, the five-component marine natural gas hydrate intelligent sensing nodes as provided by an embodiment of the present invention can get five components, analyze data quality and transmit reduced represented features.

Furthermore, the five-component marine natural gas hydrate intelligent sensing node, wherein, the titanium alloy compartment is made from high strength titanium alloy materials with maximum bearable pressure at 2000 m underwater, which can withstand high underwater pressure and doesn't deform. Said three-axis broadband sensor is installed in an orthogonal coordinate system, the three-component broadband seismometers comprise an acceleration detector, a piezoelectric detector and an MEMS detector as desired. With the high sensitivity hydrophone installed in the center of the titanium alloy compartment, the three-axis geomagnetic sensors and the inclinometer installed in a bottom of the titanium alloy compartment, an orientation measuring unit of low power consumption is formed, to provide high precision vector field information for seismic acquisition. Due to characteristics of titanium alloy materials, density thereof is only 60% of that of steel, however, some high strength titanium alloy outperform alloy structural steel in strength, and specific tenacity thereof better than other metallic materials. Therefore, the titanium alloy compartment made of titanium alloy is of high unit strength (pressure durable), good rigidity, low weight and great pressure capacity.

Lithium battery series is provided inside the titanium compartment, occupying most of space, and the integrated control chip is provided near the lithium battery series.

The temperature sensor is provided on an outer side of the titanium alloy compartment.

Measuring method with the five-component marine natural gas hydrate intelligent sensing node is as follows:

Deploy on the deck a plurality of five-component marine natural gas hydrate intelligent sensing nodes in appointed positions.

Set a time interval or deliver an instruction to send back extracted intelligently sensed features from the nodes, analyze the same at a control center, and conduct quality monitoring to the acquired data.

The five-component marine natural gas hydrate intelligent sensing node as provided by the present invention, works for undersea natural gas hydrate exploration, and has overcome defects of current four-component undersea nodes, namely, it is not possible to identify natural gas hydrates accurately and to monitor acquired data as data acquisition is done blindly.

Finally, it shall be noted that, the embodiments mentioned above serve only for explaining technical plans of the present invention rather than limiting the same; even though a detailed description has been given with reference to the aforementioned embodiments, those skilled in the art shall understand that, they can still modify technical plans described in the embodiments, and make equivalents replacement to some technical features shown therein; and these modifications or replacement, don't render nature of corresponding technical plans apart from spirit and scope of the technical plans disclosed in embodiments of the present invention.

We claim:

1. A five-component marine natural gas hydrate intelligent sensing node, comprising a titanium alloy compartment (11), an information acquisition unit, an integrated control chip and a power module for the information acquisition unit and the integrated control chip in the titanium alloy compartment (11);

Said information acquisition unit comprises a sensor unit (12) including a three-axis geomagnetic sensor, an inclinometer, a temperature sensor, three-component broadband seismometers, and a hydrophone of high sensitivity;

Said integrated control chip (12) comprises an intelligent computing unit and a transmission unit;

Said intelligent computing unit extracts quality monitoring indicators of marine natural gas hydrates by feature extraction, and transfers the quality monitoring indicators with reduced represented features to a monitoring device in the sea surface by the transmission unit;

Said quality monitoring indicators comprise amplitude, frequency and energy value of three velocity components and a pressure component.

2. The five-component marine natural gas hydrate intelligent sensing node according to claim 1, wherein, the three-component broadband seismometers and the high sensitivity hydrophone are respectively internally disposed on a bottom side and a top side of the sensor unit in the titanium alloy compartment.

3. The five-component marine natural gas hydrate intelligent sensing node according to claim 1, wherein, the temperature sensor is provided outside the titanium alloy compartment to measure seawater temperature data at where the temperature sensor is located.

4. The five-component marine natural gas hydrate intelligent sensing node according to claim 1, wherein, shackles (16) are provided in outer sides of the titanium alloy compartment (11), to connect with plastic covered steel wire ropes.

5. The five-component marine natural gas hydrate intelligent sensing node according to claim 1, the titanium alloy compartment (11) is made from high strength titanium alloy materials with maximum bearable pressure at 2000 m underwater.

6. The five-component marine natural gas hydrate intelligent sensing node according to claim 1, wherein, the three-component broadband seismometers comprise an acceleration detector, a piezoelectric detector and an MEMS detector.

7. The five-component marine natural gas hydrate intelligent sensing node according to claim 1, wherein, all intelligent sensing nodes (1) are fixed on the plastic covered steel wire ropes (2) in predetermined intervals, and the plastic covered steel wire ropes (2) are connected with a center control end, to conduct an accurate marine natural gas hydrates prospection, and transfer acquired information to the center control end.

* * * * *